(12) United States Patent
Aldriedge

(10) Patent No.: US 9,332,581 B2
(45) Date of Patent: May 3, 2016

(54) BLUETOOTH WEARABLE INTERFACE AND BROKERAGE SYSTEM

(71) Applicant: Stephen Aldriedge, Garland, TX (US)

(72) Inventor: Stephen Aldriedge, Garland, TX (US)

( * ) Notice: Subject to any disclaimer, the term of this patent is extended or adjusted under 35 U.S.C. 154(b) by 0 days.

(21) Appl. No.: 14/702,692

(22) Filed: May 2, 2015

(65) Prior Publication Data

US 2015/0237665 A1     Aug. 20, 2015

(51) Int. Cl.
    *H04W 76/02*     (2009.01)
    *G06F 3/01*     (2006.01)
    *H04W 4/00*     (2009.01)

(52) U.S. Cl.
    CPC .............. *H04W 76/023* (2013.01); *G06F 3/014* (2013.01); *H04W 4/008* (2013.01)

(58) Field of Classification Search
    CPC ............ G06F 2203/0331; G06F 3/014; G06F 3/0488; G06F 21/32; G06F 3/04883; G06F 3/0362; G06F 2203/0339; G06F 1/163; A63F 2009/241; H04B 7/04; H04W 8/005; H04W 76/022
    See application file for complete search history.

(56) References Cited

U.S. PATENT DOCUMENTS

| | | | |
|---|---|---|---|
| 8,406,167 B2 | 3/2013 | Den Hartog | |
| 2008/0238807 A1* | 10/2008 | Ibrahim et al. | 343/876 |
| 2010/0190444 A1* | 7/2010 | Parhami et al. | 455/41.3 |
| 2011/0007035 A1* | 1/2011 | Shai | 345/179 |
| 2012/0146899 A1 | 6/2012 | Teng | |
| 2012/0249430 A1* | 10/2012 | Oster et al. | 345/173 |
| 2012/0293410 A1* | 11/2012 | Bell | 345/158 |
| 2013/0113709 A1* | 5/2013 | Wine | 345/169 |
| 2013/0225197 A1* | 8/2013 | McGregor et al. | 455/456.1 |
| 2013/0257804 A1 | 10/2013 | Vu | |
| 2014/0006954 A1* | 1/2014 | Raffa et al. | 715/733 |
| 2014/0094124 A1 | 4/2014 | Dave | |
| 2014/0134958 A1* | 5/2014 | Sanchez et al. | 455/73 |

* cited by examiner

*Primary Examiner* — Ping Hsieh
*Assistant Examiner* — James Yang
(74) *Attorney, Agent, or Firm* — Texas A&M University School of Law—IP and Technology Law Clinic

(57) ABSTRACT

The Bluetooth wearable device can include a single ring which fits over the user's thumb or other finger. The wearable device interfaces with specialized software to provide two primary functions. First, the ring in combination with specialized software maps the rest of the user's hand in order to take input from fingers that are not currently wearing a device. Two contact points touch the screen of a device and conduct the electric current along the user's skin to interact with a capacitive screen. Second, the ring acts as a broker to connect a paired device with a touchscreen device. Between the twin contacts is a color sensor. The software on the touchscreen device displays a color to indicate how the devices should establish their connection. Using this information, the ring initiates the connection.

9 Claims, 8 Drawing Sheets

BLUETOOTH WEARABLE INTERFACE AND BROKERAGE SYSTEM

BACKGROUND

1. Technical Field

The present application relates to wearable technology which facilitates interaction with paired or otherwise connected devices.

2. Description of Related Art

Bluetooth enabled wearable technology often comes in the form of a ring or bracelet. These "wearables" can act as intermediaries between the user and the device so that the user does not need to handle the device to perform basic functions. For example, a ring might switch between songs when paired with a music player. Wearables can also act as interfaces. Where some users might use a trackpad as a mouse, other users may wear a single ring to map a single finger's movements to a paired device. Software interacting with these devices generally only accommodates one finger identified by the ring. Whichever finger has contact with the touchscreen using the wearable is the finger the software recognizes.

These systems can be improved to utilize the full hand. Technology users are quickly entering an age of software where gaining the full use of their hands would be a vast improvement over single finger point and click.

Wearables can act as an intermediary between devices. For example, some wearables provide methods for data exchange where the wearable holds data to transfer between two devices. The user, however, may need to be in the middle of the transfer as well, adding time to the transaction and difficulty for unsophisticated users. Handling multiple devices at once can also be difficult for some users who would now have to use all three devices (both paired devices and the wearable) to move data back and forth.

These systems, too, can be improved. The user can be removed from the transaction so that data transfer or connection mechanisms happen behind the scenes between the user's myriad devices.

DESCRIPTION OF DRAWINGS

The novel features believed characteristic of the system of the present application are set forth in the appended claims. The system itself, as well as a preferred mode of use, and further objectives and advantages thereof, will best be understood by reference to the following detailed description when read in conjunction with the accompanying drawings, wherein:

DESCRIPTION OF PREFERRED EMBODIMENT

Illustrative embodiments of the system of the present application are described below. All features of an actual implementation may not be described in this specification. The development of any such actual embodiment may include numerous implementation-specific decisions to achieve the developer's goals which will vary from one implementation to another. Such development effort, though complex and time-consuming, would nevertheless be a routine undertaking for those of ordinary skill in the art having the benefit of this disclosure.

The present application can be thought of as two components that interact to create a system allowing the user to handle their devices in a new way. These two components consist of the physical ring and the ring interface software resident on the user's devices.

Figure 1:
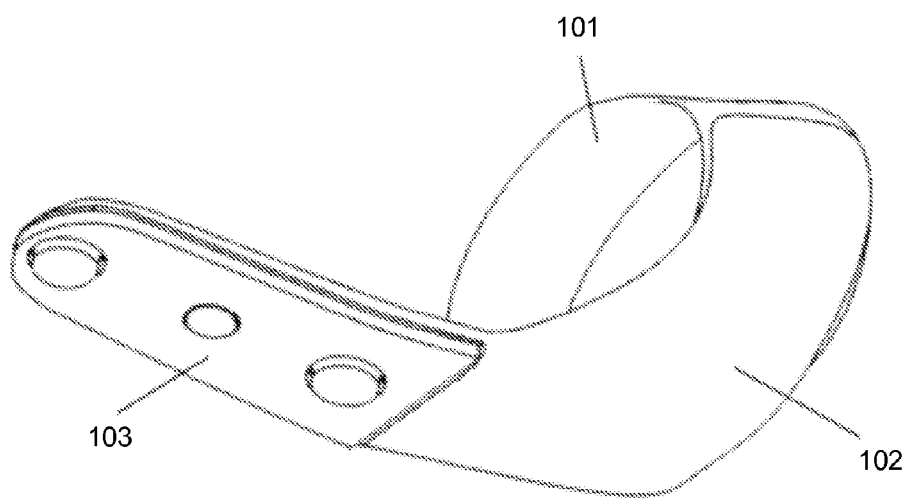
FIG. 1 is a perspective view of one example embodiment of the ring.

FIG. 1 shows the physical ring according to one example embodiment. Ring member 101 is a sleeve that fits snugly around the user's thumb. The user can wear the ring apparatus on any finger; however, it is preferred that the ring be coupled to the user's thumb. Accordingly, the example embodiment is illustrated with the ring apparatus on the user's thumb. The material of ring member 101 is configured to keep ring housing 103 stable while still allowing full range of motion for the thumb. In alternate embodiments, ring member 101 may be made of an elastic material or rigid material with adjustable strap 102 to fit different sizes of thumbs or fingers. The embodiment shown in FIG. 1 can be made of conductive, nonconductive, or anti-static materials and still be able to simulate touch on the target touch screen device. The material of ring member 101 can be flexible enough to allow the user to flex and move their fingers along the screen similar to how they might use a track pad mouse or type on a touchscreen.

Figure 2:
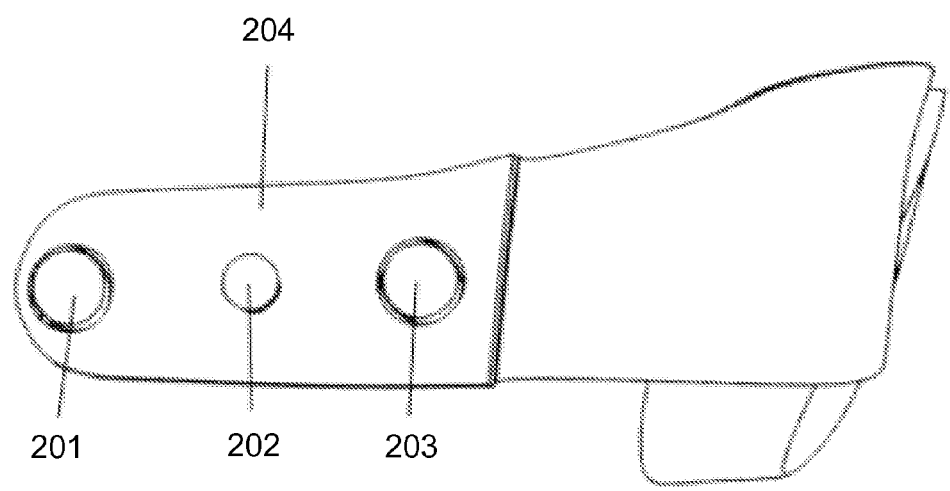
FIG. 2 is a bottom view of the ring showing the contact surface with two contact points and the color sensor.
Figure 5:
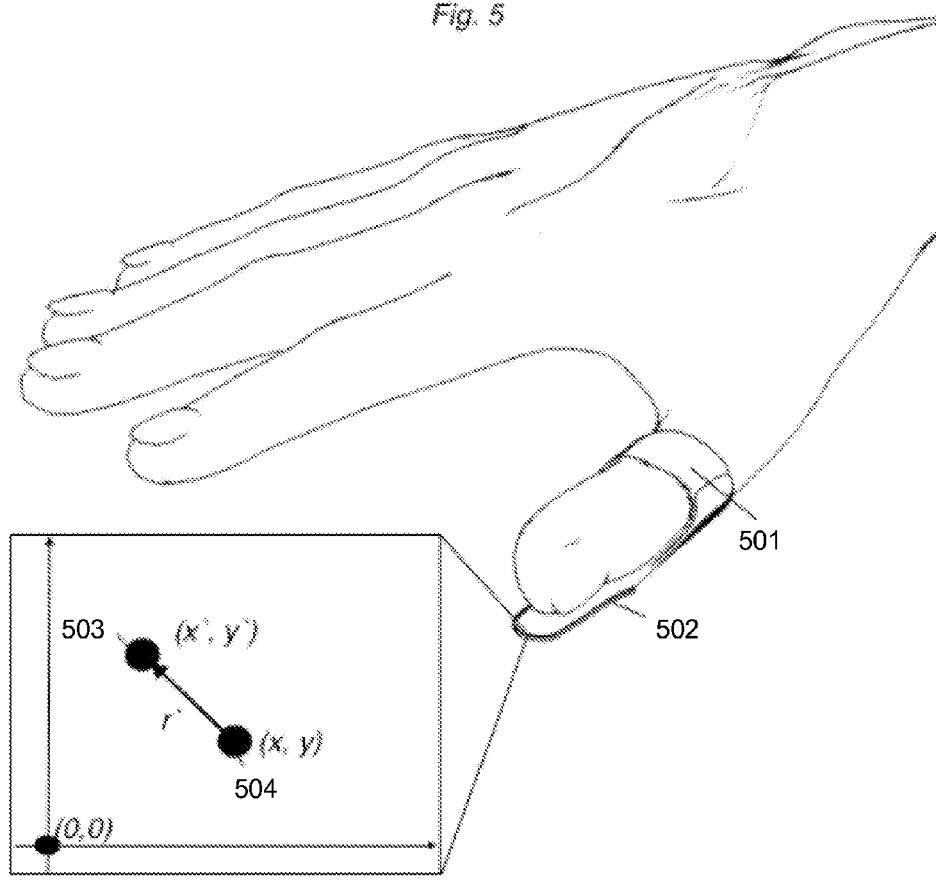
FIG. 5 is a perspective view of the ring in use accompanied by a diagram of the vector calculation between two contact points if the touch screen of the target devices was viewed as a coordinate plane.

Referring also to FIG. 2, contact point 201 and contact point 203 can be located on a contact surface 204. Contact points 201 and 203 align along the side of the thumb that would naturally rest against a touchscreen. It should be appreciated that the exact location of contact points 201 and 203 is implementation specific; however, it is preferable that both contact points 201 and 203 are on the same plane as the touch screen surface of the target device. As the user moves his or her thumb, contact points 201 and 203 glide across the touch screen surface. The configuration of contact points 201 and 203 allow for the full range of motion of the thumb along the plane of the touch screen surface. FIG. 5 demonstrates how the user can rest his or her hand against the screen for use of both contact points 201 and 203 and the rest of his or her hand.

The preferred embodiment requires at least two contact points, namely contact points 201 and 203. In order to determine the orientation of the user's hand, the software performs a vector calculation to find the direction of a line between the two contact points. Contact points 201 and 203 are each capable of emitting a detectable frequency. Contact points 201 and 203 can emit different frequencies or the same frequency for the software of the target device to detect depending how the hardware is being used.

As shown in FIG. 2, a small color sensor 202 can be located between contact points 201 and 203. FIG. 2 shows an example of how color sensor 202 may be aligned with contact points 201 and 203. In order to be effective, color sensor 202 should be located on contact surface 204 so that it can detect and identify color displayed by the software on the target device's screen.

Figure 3:
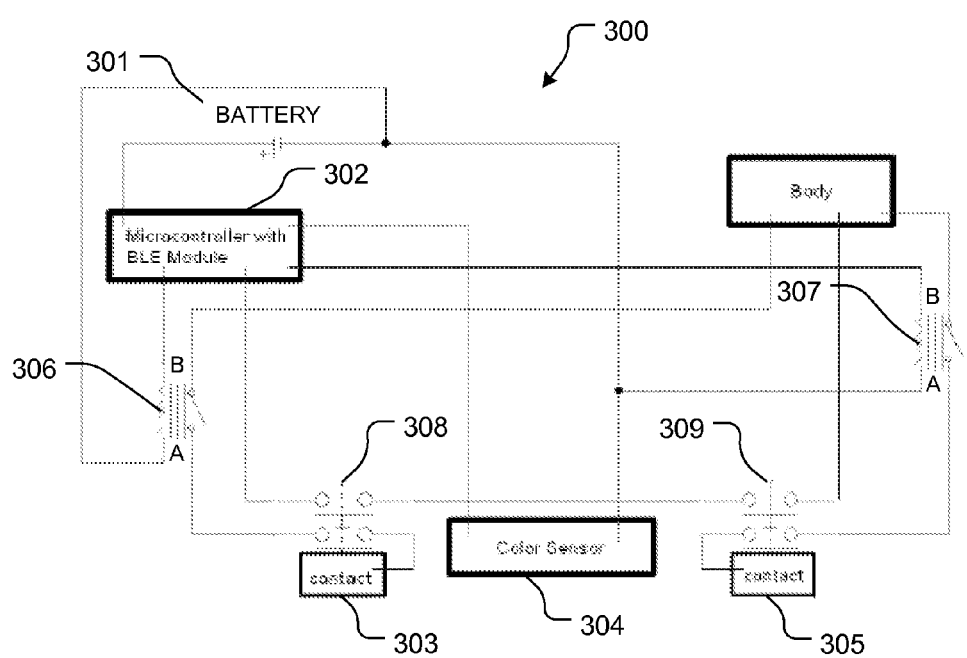
FIG. 3 is a wiring diagram of the ring housing.

Referring now to FIG. 3, contact points 303 and 305 as well as color sensor 304 communicate with microcontroller 302. Microcontroller 302 causes contact points 303 and 305 to emit a frequency via electric switches 306 and 307 when momentary switches 308 and 309 are pushed in. Microcontroller 302 is equipped with a Bluetooth Low Energy (BLE) Module and powered by battery 301. Microcontroller 302 is flashed with software to handle the input and output from and to contact points 303 and 305, color sensor 304, and the BLE Module. The ring member 101 can have two states that govern what information the microcontroller is handling, for example: a touch mode and a broker mode.

Touch Mode

Touch mode is triggered when momentary switches 308 and 309 are pushed in. When the ring apparatus is pushed against the touchscreen of the target device, momentary switches 308 and 309 close and complete the circuit. In touch mode, microcontroller 302 causes one frequency to be emitted through contact point 303 and a different frequency through contact point 305. This difference in frequencies is how the ring apparatus identifies which contact point is on "top" and which is on "bottom." This information is received by software on the target device to calculate a vector between contact points 303 and 305. Microcontroller 302 emits the frequencies via contact points 303 and 305 briefly and only so long as is necessary for the touchscreen device software to recognize the ring member 101.

Figure 4:
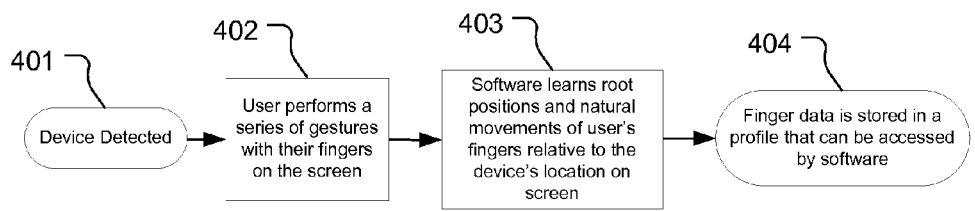
FIG. 4 is a method diagram showing how the software in conjunction with the ring apparatus can map the geometry of a user's hand.

Software on the touch screen device interacts with the ring apparatus to map the user's hand. FIG. 4 describes an example method to map the other fingers on the user's hand. In step 401, the software first detects the presence of the ring apparatus. Step 402 is the training phase where the user performs a series of gestures using the ring apparatus to show the user's natural hand movements to the software. The software learns these natural positions in step 403. Finally in step 404, the software stores the learned hand map in a profile that can be accessed by other software on the target touch screen device.

While training the software to map the user's hand, the software detects these frequencies and assigns a position to contact points 303 and 305 based on the coordinate plane of the touch screen surface. For example, FIG. 5 shows contacts points 303 and 305 assigned a position on the screen. In this example, contact 303 is emitting the "top" frequency at position 503 (for the sake of the example, let position 503 be coordinate (5, 2)) and contact point 305 is emitting the "bottom" frequency (for the sake of the example, let position 504 be coordinate (3, 4)). These points can be given position vectors from the origin of the plane as:

contact point 303 = $\vec{r_{503}} = 5\hat{i} + 2\hat{j}$ contact point 305 = $\vec{r_{504}} = 3\hat{i} + 4\hat{j}$ Knowing the position vectors from the origin for these points, the software can find a displacement vector, or directional vector, by subtracting the position vector for "bottom" contact point 504 from the position vector for "top" contact point 503. This calculation is as follows:

directional vector = $\vec{r'} = \vec{r_{503}} - \vec{r_{504}}$ $\vec{r'} = (5\hat{i} + 2\hat{j}) - (3\hat{i} + 4\hat{j})$ $\vec{r'} = 5\hat{i} + 2\hat{j} - 3\hat{i} - 4\hat{j}$ $\vec{r'} = 2\hat{i} - 2\hat{j}$ Knowing $\vec{r'}$ gives the software the direction the user's thumb is pointing in. This vector gives the orientation of the hand on the touch screen. In addition to finding the direction vector from the ring, the software monitors for four other contacts from the other fingers. The user can slide his or her fingers along the screen to give the software information on how the fingers naturally move in relation to the thumb and in the orientation given by the vector. Once training has completed, the software stores the hand data in a user profile to be used later by the software.

Figure 6:
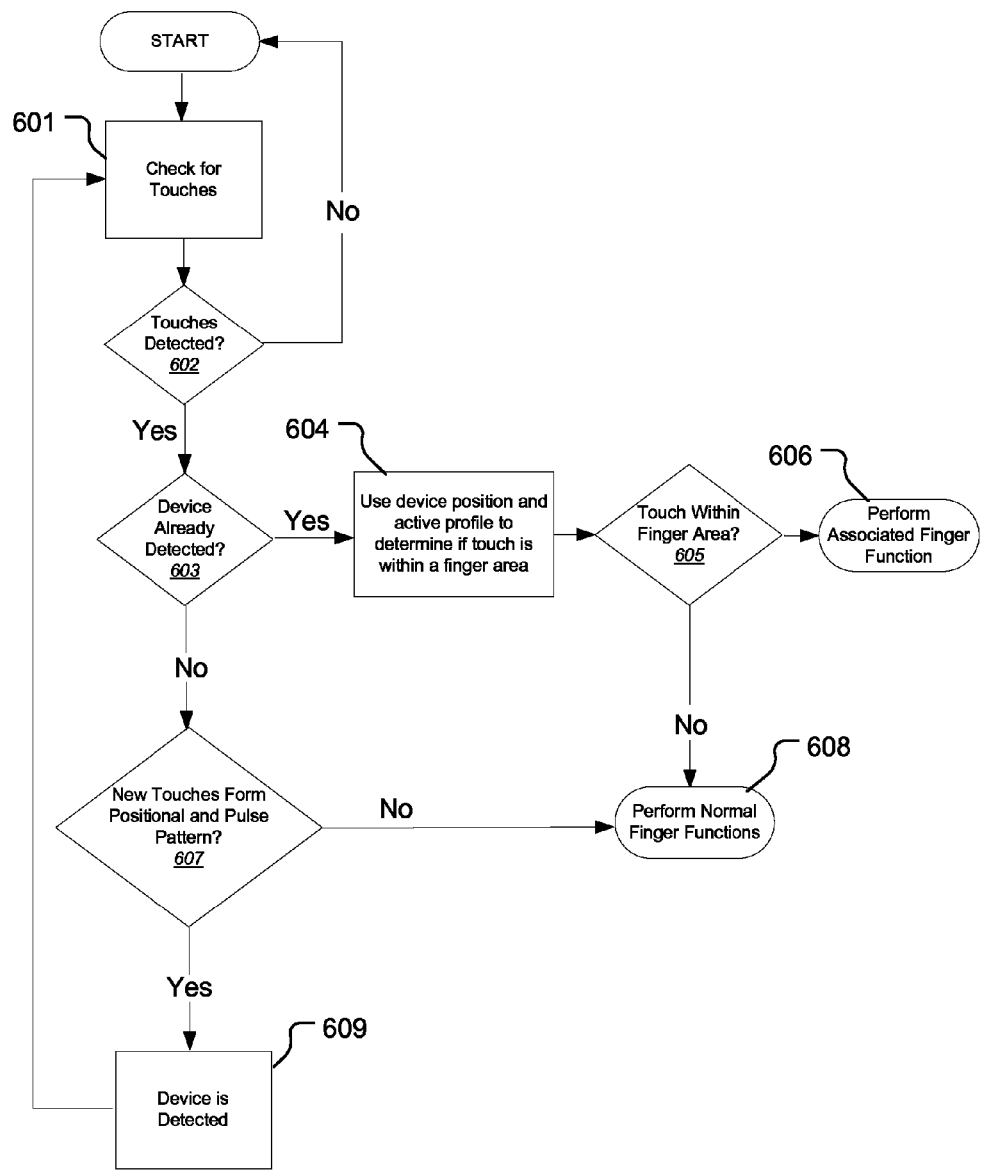
FIG. 6 is a method diagram showing how the software in conjunction with the ring apparatus can detect the difference between normal touch functions and mapped touched functions.

Referring now to FIG. 6, the software can differentiate between ordinary screen touches and touches that are aligned with the ring member 101. In steps 601 and 602, the software detects a touch on the touch screen. In step 603, the software determines whether ring member 101 has already been detected. If ring member 101 has been detected, then in step 604 the software accesses the user's stored hand profile to determine if the touch was in a mapped area in relation to the ring member 101. This determination is made in step 605. If the touch is within the hand profile's finger area, then the software will perform some associated finger function in step 606. If the touch was not in the hand profile's finger area, then the software proceeds to step 609 and treats the touch as a normal touch outside the hand area. If the device has not already been detected in step 603, then the software checks for two touch points that are the same distance apart as contact points 303 and 305 and emitting the correct frequency in step 607. If the software discovers these points, then it has found the ring member 101 in step 609 and will loop back to step 601 to check for touches. If not, then the touch is treated as a normal touch in step 608.

Broker Mode

Figure 7:
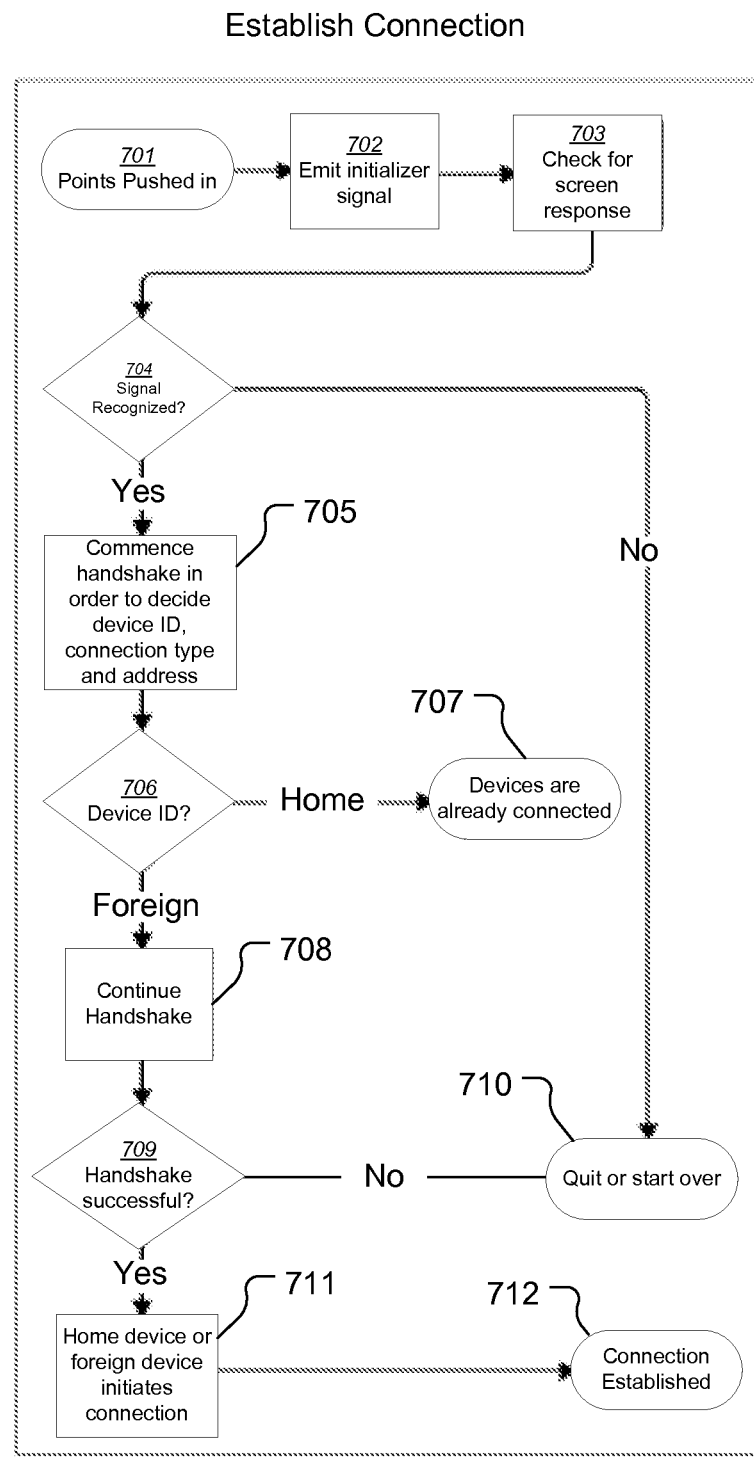
FIG. 7 is a method diagram showing how the software in conjunction with the ring apparatus can broker a connection between two devices.

In broker mode, as described in FIG. 7, microcontroller 302 communicates with contact points 303 and 305, color sensor 304, and the BLE Module. After both contact points 303 and 305 have made contact in step 701, microcontroller 302 triggers an initializer signal in step 702 through contact points 303 and 305. In steps 703 and 704, microcontroller 302 monitors for a recognizable signal from color sensor 304. While in broker mode, the ring apparatus is paired with a home device. The ring apparatus can broker a connection between the paired home device and a target foreign device.

Color sensor 304 monitors for a color sequence from the target foreign device. This color sequence is displayed on the screen of the foreign device by the foreign device's software. The foreign software maintains a list of available connection methods that are mapped to a color sequence. Once detected by the ring member 101, microcontroller 302 proceeds to step 705 and commences a handshake to determine device ID, connection type, and address. The color sequence detected by color sensor 304 is translated into a proposed connection method. Microcontroller 302 also received information on device ID (identifying the device is either the home device a foreign device which wants to connect) and addresses to identify the devices for connection. If the device is a home device, then the device is already connected and the method ends in step 707. If the device is a foreign device, the software and microcontroller 302 continue with the connection handshake in step 708. Microcontroller 302 uses the BLE Module to relay this information back to the paired home device.

The software on the paired home device responds either that it accepts the connection method suggested or that it needs a different method. This response determines whether the handshake was successful in step 709. If it was successful, then either the paired home device or the foreign device will initiate the connection in step 711 and establish a connection in step 712. If it was not successful, then the process starts over, but with a different color sequence indicating a different connection method. If all connection methods are exhausted with no alternative remaining, then the process will error out and no connection will be made.

Figure 8:
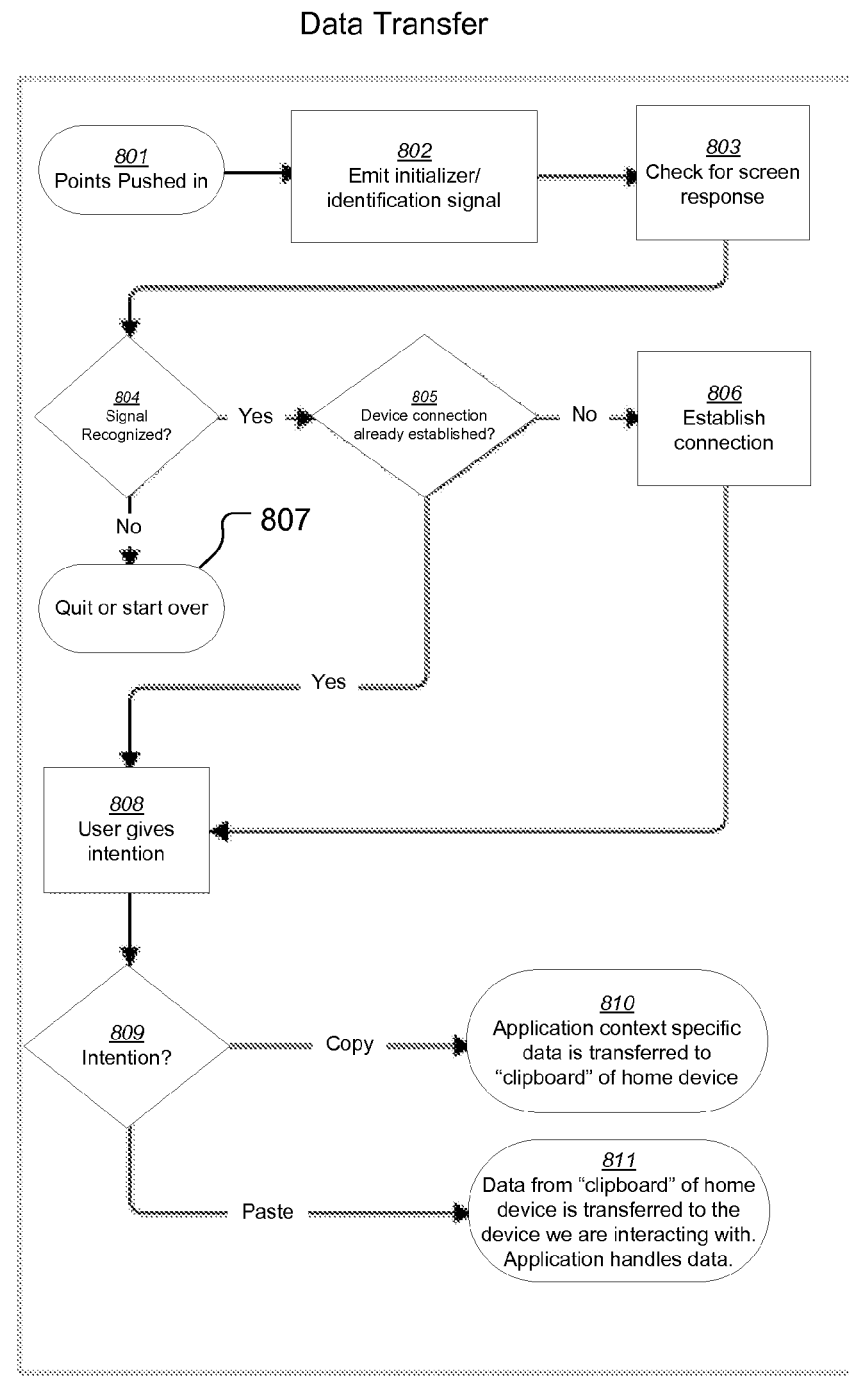
FIG. 8 is a method diagram showing how the software in conjunction with the ring apparatus may exchange data.

While in broker mode, the ring member 101 can also assist in data transfer as seen in FIG. 8 after a connection has been established between the paired home device, ring member 101, and the foreign device. Similar to connection brokering, the ring member 101 can identify itself to the touchscreen device through an initializing signal via contact points 303 and 305 in steps 801 and 802. In step 803, microcontroller 302 checks for a screen response through color sensor 304. If the signal is not recognized in step 807, the method ends or starts over. If the signal is recognized, then the microcontroller 302 determines whether the home and foreign devices are already connection. If they are not, then a connection is established in step 806.

Using the ring member 101, the user can perform two functions: copy or paste. In steps 808 and 809, the user will indicate his or her intention to the software of the foreign device. If the user is copying in step 810, the ring member 101 will move application specific context data to the clipboard of the paired home device. If the user is pasting in step 811, then the ring member 101 will move the paired home device's clipboard data to the foreign device. Because a connection has already been established between the home device and the foreign device, the ring member 101 is not actually holding any of this data. The data can transfer over whatever communication protocol was selected when brokering the connection. Instead, the ring member 101 triggers the home device and foreign devices to move data between each other.

The embodiments of the present application provide a more natural and intuitive experience when using a touchscreen. A software application which implements this technology can cater to the user by ensuring that the most commonly used functions are always at their fingertips. The user spends less time moving their hands around a screen to get to these functions. Adaptive, personalized user interfaces make a completely flat touchscreen have a similar convenience to physical interfaces like a keyboard or video gaming controller.

The technology also brings more convenience when needing to transfer data between touchscreen devices. The abstraction of a simple copy and paste between touchscreen devices lets the user feel as if they are physically carrying and placing the data.

The particular embodiments disclosed are illustrative only, as the system may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

The invention claimed is:

1. A method of brokering a connection via a wearable ring between a device having a screen and a ring-paired device, the method comprising:
    monitoring for contact between a first contact and a second contact of the wearable ring on the screen, thereby causing the wearable ring to begin emitting an initializer signal through the first contact and the second contact, the initializer signal being detectable by the screen;
    defining an address for both the device and the ring-paired device;
    negotiating a connection protocol between the device and the ring-paired device via the device by displaying a color sequence on the screen, the colored sequence being monitored by a color sensor on the wearable ring;
    exchanging connection details in a connection handshake; and
    completing the connection;
    wherein the step of displaying a color sequence on the screen is in response to the screen detecting the initializer signal from the first contact and the second contact of the wearable ring.

2. The method according to claim 1, wherein the step of negotiating a connection protocol further comprises:
    matching a color to a connection option;
    flashing the color on a screen of the device;
    translating the connection option to a low energy short range communication message;
    relaying connection information to the ring-paired device;
    determining an acceptability of the connection option in a result;
    translating the result to a frequency message;
    relaying the result to the target device;
    detecting a frequency from the first contact and the second contact on the wearable ring; and
    determining a connection completion or a new connection option from the frequency.

3. The method according to claim 1, wherein the step of determining the connection completion further comprises:
    initiating the connection to the address of the ring-paired device.

4. The method according to claim 1, wherein the step of determining the connection completion further comprises:
    receiving the connection from the address of the ring-paired device.

5. The method according to claim 1, further comprising:
    transferring data after the wearable ring has been connected to the ring-paired device.

6. The method according to claim 1, further comprising:
    monitoring for a location on the screen of the first contact and the second contact of the wearable ring.

7. The method according to claim 1, further comprising:
    determining whether the connection has been established.

8. The method according to claim 1, further comprising determining an intention of a user.

9. The method according to claim 1, further comprising:
    transferring data between the target device and the ring-paired device.

* * * * *